Jan. 5, 1932.  E. J. PERRY  1,840,209
WASHING MACHINE
Filed July 1, 1926   8 Sheets-Sheet 5

Inventor
Emanuel J. Perry
By Bacon Thomas
Attorneys

Jan. 5, 1932.  E. J. PERRY  1,840,209
WASHING MACHINE
Filed July 1, 1926   8 Sheets-Sheet 6

Inventor
Emanuel J. Perry
By Bacon Thomas
Attorneys

Jan. 5, 1932.   E. J. PERRY   1,840,209
WASHING MACHINE
Filed July 1, 1926   8 Sheets-Sheet 7

Inventor
Emanuel J. Perry
By Bacon Thomas
Attorneys

Jan. 5, 1932.   E. J. PERRY   1,840,209
WASHING MACHINE
Filed July 1, 1926   8 Sheets-Sheet 8

Inventor
Emanuel J. Perry
By Bacon & Thomas
Attorneys

Patented Jan. 5, 1932

1,840,209

UNITED STATES PATENT OFFICE

EMANUEL J. PERRY, OF NEW BEDFORD, MASSACHUSETTS, ASSIGNOR TO THE AMERICAN LAUNDRY MACHINERY COMPANY, OF NORWOOD, OHIO, A CORPORATION OF OHIO

WASHING MACHINE

Application filed July 1, 1926. Serial No. 119,945.

The invention relates to improvements in power driven washing machines.

It is an object of the invention to provide an improved control mechanism for the rotating washing cylinder of the machine.

The invention more particularly relates to a washing machine in which the washing cylinder is operated by power driven belts cooperating with a part thereof.

The machine forming the subject matter of this invention is of the type having a rotating washing cylinder within the casing, with means for moving said cylinder from the casing for the removal of garments therefrom.

The invention more specifically aims to provide a simplified and effective control mechanism for stopping the actuation of the washing cylinder, centering the same, and thereafter locking the cylinder in a centered position so that when it is moved from the casing the door opening therein will be in a position to discharge the contents by gravity.

The invention further relates to a washing machine having an improved form of mechanism for stopping, centering and locking the cylinder.

While the invention has particular reference to washing machines, it will be understood that the same is applicable for use in connection with drying machines, tumblers, or any devices where it is desirable to lift a rotary cylinder from a casing.

The control mechanism forming the subject matter of this invention is shown as being applied to a washing machine of the general type disclosed in my co-pending application Serial No. 50,075, filed August 13, 1925.

In the accompanying drawings.

Referring now more particularly to the drawings wherein like characters indicate corresponding parts, the numeral 1 designates the outer casing of a washing machine having a hinged closure or door 2 movable with the washing cylinder to permit the same to be raised from the casing when the contents are to be dumped. The washing cylinder is represented by the reference character 3, and is of a conventional type embodying a sliding door which is generally designated at 4 in Figure 15 of the drawings. The cylinder is perforated and is preferably rotated in alternate directions by the provision of a shifter mechanism which will be hereinafter described.

The frame 3' of the machine supports suitable driving mechanism including belts driven from any suitable source of power. This driving mechanism embodies a drive shaft 5 journaled in suitable bearings and having at each end thereof adjacent the sides of the washing machine, sprocket wheels 6 around which the chains 7 travel. These chains in turn cooperate with sprocket wheels 8 mounted on each end of a shaft 9 extending longitudinally of the casing and carrying thereon near each end, gears 10 which enter openings in the casing and mesh with the ring gears 11, one being provided at each end of the washing cylinder 3. A pair of belt pulleys 12 and 13 are loosely mounted on the shaft 5. These pulleys are mounted in spaced relation to accommodate between them a third pulley 14 which is keyed to the shaft. The pulleys 12 and 13 are therefore idler pulleys and when the belts are thereon, no power is applied to the machine.

A reversing frame 15 is disposed around the pulleys 12, 13 and 14. This reversing frame embodies a transverse rod 16 having springs 17 disposed on each side of the belt shifter 18 which is slidably mounted on the rod 16. The shifter 18 carries a pair of belt receiving loops 19 and 20, through which the belts 21 and 22 respectively pass. The belt 22 is a cross belt, thereby affording a drive in a direction opposite to that produced by the straight belt 21.

To alternately shift the belts into and out of engagement with the fixed pulley 14, shifter mechanism is employed of the general type disclosed in my co-pending application Serial No. 50,075, to which reference has heretofore been made. This shifter mechanism embodies a worm 23 keyed to the shaft 5 meshing with a worm gear 24 having an eccentrically mounted pin 25 thereon. A shifter lever 26 is pivoted to a link 27, which link is attached to a permanent part of the machine. This lever is provided with a non-circular opening 28 receiving the pin 25 while the upper end of the lever is connected with a controlling cam 29 which is in turn pivoted to the belt shifter 18 on the rod 16. This cam furthermore has a groove 18' in its lower surface which engages with a transverse pin 26ª on the upper end of the lever when the machine is in operation. Obviously when the cam is lifted, it becomes disengaged from the pin carried by the upper end of the actuating lever. The rotation of the shaft 5 causes a back and forth movement of the shifter lever 26, which in turn imparts a reciprocating movement to the belt shifter 18 so that the crossed and straight belts are alternately brought into contact with the fixed pulley 14. The shifter frame also has a pair of spaced ears 30 receiving a shaft 31 having a cam portion 33 between the ears 30, which cam portion receives the brake 34 so that when the cam 30 is operated, this brake will be forced into engagement with the periphery of the fixed pulley 14 and retard or stop the motion of the shaft to which this pulley is secured. The foregoing mechanism is in play during the rotation of the washing cylinder in the casing.

To lift the washing cylinder from the casing after its rotation a mechanism is provided as follows:

The shaft 5 also carries a belt driven mechanism embodying a pair of loose pulleys 36 and 37 on each side of a pulley 38 having an elongated sleeve which rotates on the shaft 5. This pulley 38 carries at one end a bevelled gear 39 meshing with a gear 40, which gear 40 rotates a shaft 41 having a worm 42 thereon meshing with a worm gear 43 on the shaft 44. This shaft extends longitudinally of the washing machine and carries a pair of gears 45 one at each end thereof, which gears mesh with the teeth on intermediate gears 45'. The gears 45' mesh with the teeth on the periphery of the segments 46, which segments receive the washing machine cylinder 3 of the machine, as has been heretofore described. It will be appreciated that the washing cylinder 3 is supported by the arms 49 of the segments, at their outer end being journaled in the sides of the machine, while the inner ends of the arms receive the stub shafts 50 on which the cylinder rotates. When the segments 46 are lifted, they in turn lift the washing machine cylinder. This lifting or raising movement also raises the closure for the casing of the machine. It will be observed that the segments each carry a lug 50' at one end, which lugs are adapted and do engage suitable stops 51' in order to limit the upward movement of the cylinder or in other words, to prevent the cylinder from being lifted too far from the casing in the event the other mechanism which will be later described fails.

It will be understood that the washing cylinder is not to be moved from the casing until the garments are to be discharged therefrom, and of course, until the rotation of the cylinder has ceased. The invention embodies a novel control mechanism for controlling the driving means for oscillating or rotating the cylinder. It is highly desirable to provide as simple a mechanism as possible which will disconnect the power to the cylinder, will arrest its movement in a determined position and will lock the cylinder in its proper centered position so that when it is lifted from the casing, the door opening therein will be so positioned that the garments will readily discharge by gravity from the cylinder. In the present invention this control mechanism embodies a controlling lever 61 which is loosely mounted on a shaft extension 62 projecting from one side of the washing machine casing. This lever carries a connecting portion 61' which has a rotatable connection with a dog 63. The dog 63 has a pocket 63' in one face into which pocket a complemental extension 62' of the lever 61 extends, the connection being maintained by a plate 64' which is secured in any suitable manner to dog 63. This connection permits the dog 63 to rotate relative to the lever 61 but compels this dog to shift laterally with a shifting movement of the lever 61. A housing 64 encases this dog 63 and also encases or encloses a similar dog 65 which is loosely mounted on the shaft 62. Both dogs have interlocking clutch faces 65' which when brought together cause an interlocking of these dogs. Normally during the operation of the machine there is no interlocking engagement between the dogs, and the dog 63 is constantly oscillating. The housing furthermore has a cam slot 67 therein through which the lever 61 passes. The lever 61 is provided with an arm 62A connected with a link 63B which is in turn connected with a slidable locking bolt 64C moving in the housing 64D. The dog 63 likewise has a projecting arm 65B which is connected with a link 66, the link in turn being eccentrically connected with the washing cylinder 3 so that during the movement of this cylinder this link 66 is constantly oscillating. It will be also appreciated that the dog 65 has an arm 69 which is in turn pivotally connected with the shaft 31 journaled in suitable brackets 71. This shaft carries a cam 72 which is keyed thereto so that when the shaft is rotated the cam is raised. The shifter control cam 29 of the shifter mechanism lies in the path of this member. This cam 29 is pivotally connected with the shifter and has a V-shaped slot A therein near its end. A projection 81 spans this enlarged end of the shifter control cam 29, this projection 81 being fixed to a stationary part of the machine. It is apparent, therefore, that if the member 72 is raised it must contact with the underside of the shifter control cam 29, and by lifting this shifter against the inner walls of the fixed guide 82, the shifter due to the bevelled walls forming the opening 80 therein is compelled to move to a neutral position with the bottom of the opening engaging the guide where both belts are on the idler pulleys.

Figure 2:
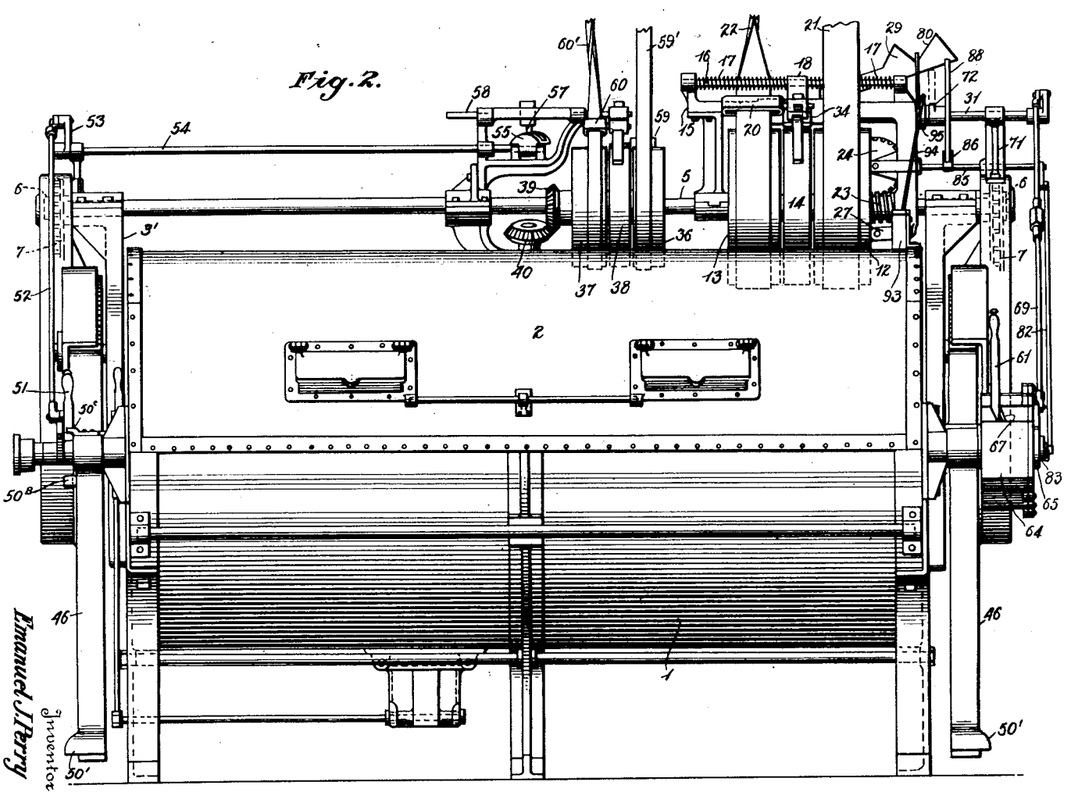
Figure 2 is a front elevation.
Figure 6:
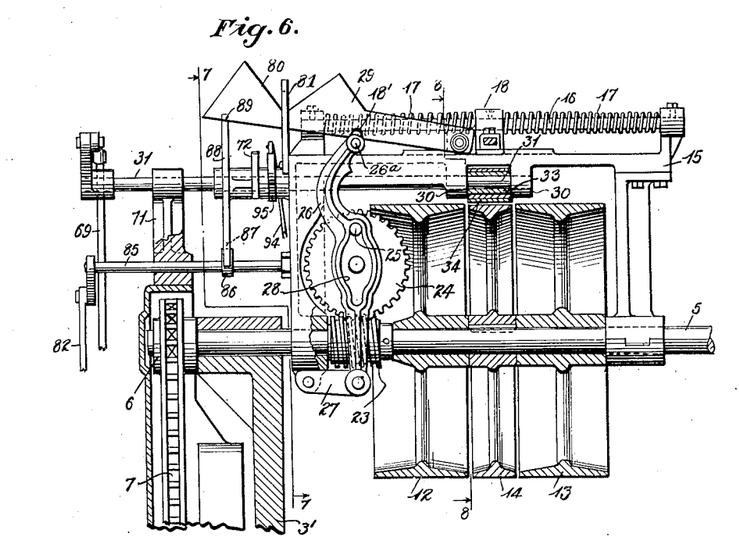
Figure 6 is an enlarged longitudinal sectional view of the driving mechanism.
Figure 7:
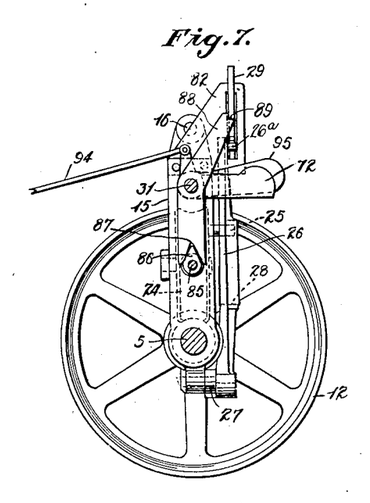
Figure 7 is a transverse sectional view on line 7—7 of Figure 6.
Figure 8:
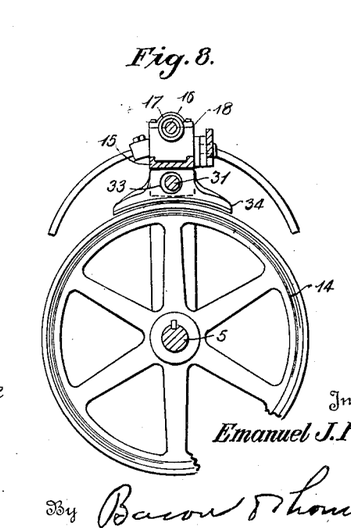
Figure 8 is a transverse sectional view on line 8—8 of Figure 6.
Figures 9, 10, 11:
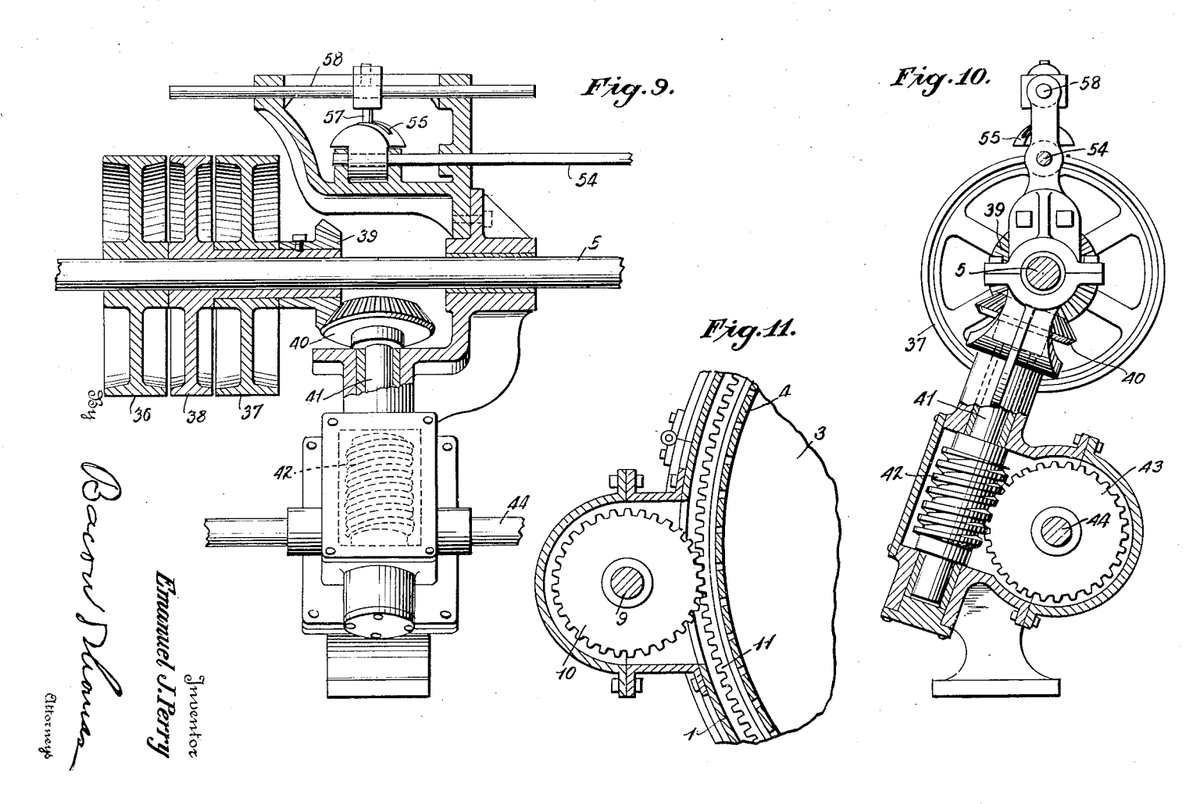
Figure 9 is an enlarged longitudinal sectional view of the lifting mechanism.
Figure 10 is a transverse section thereof.
Figure 11 is an enlarged section of the cylinder driving connection.

As the lever 61 is moved rearwardly, it of course forces the dog 63 laterally toward the dog 65 because of the cam slot through which the lever passes. The clutch faces are therefore brought into aligning paths. The dog 63 is constantly oscillating and when the dog faces thereon are brought into alignment, the oscillating movement of this dog 63 is imparted to the dog 65, which movement shifts the arm link 69, which has been heretofore described, which arm or link is connected with the shaft 31 by means of a crank. This arm or link also has a turnbuckle 69ª intermediate its ends by means of which its length can be adjusted. Immediately the two dogs become inter-locked, the power to the machine is disconnected by the mechanism just described. The rotation of shaft 31, in addition to shifting the transmission to neutral, operates to apply the brake 34 to the pulley 14 by reason of the eccentric mounting of this brake on the shaft as shown in Fig. 18. The link 66 is so connected with the cylinder 3 of the washing machine and the arm 69 so connected with the shifter mechanism that when the cylinder of the machine stops rotating, it will be at a time when this cylinder is properly centered and the locking opening 90 of disc 67 aligned with the locking bolt 64C. The connections are made when the machines are constructed so that the cylinder will stop at the desired time as described. Should any adjustment be necessary, this may be accomplished by the turnbuckle in the rod 69. The operating lever 61 is in a positon represented by the character B at this time. The machine has ceased operation. A spring 90' is connected with the dog 65 so that when the operating lever 61 is moved forwardly to the position represented by the character C to throw the locking bolt 64ᶜ into the aligned opening 90 of the disc 67 to lock the same in its centered position, the dog 65 is likewise rotated to the right, but this cannot occur until the following mechanism has come into play. Just as soon as the washing cylinder has been arrested in its movement, a second rod 82 which is pivotally connected with a spring actuated lever 83, which lever in turn is pivoted to a stationary part of the machine, and moves under the influence of this spring 84 so as to impart a motion to the shaft 85 with which this rod 82 is connected. This shaft 85 carries a crank arm 86 seating in an inverted V-shape slot 87 formed in the lower end of a bell crank lever 88. This bell crank lever at its upper end has a notch 89 therein. When the shifter control cam 29 is in its lifted or raised position, as shown in Figures 2 and 6, due to the raising of the cam 72 by the rod 69, then of course, it is apparent that the notched end 89 of the lever 88 will slide in under the lower edge of the shifter and will maintain this shifter in its neutral or inoperative position until the lever 83 is shifted against the tension of the spring 84 to release the shifter 29 and permit the same to drop. The shifter control cam 29, while in its lowered position, will prevent the notched end 89 of the lever 88 from moving to the right, as shown in Fig. 7, until the shifter control cam 29 has been lifted by the cam 72. It is to be understood that the lever 88 is constantly under the influence of the spring 84 which is connected to the lever 83 but this spring is prevented from moving the lever 88 until after the shifter control cam 29 has been raised out of the path of movement of the intermediate portion of the said lever 88. It is therefore obvious that when the lever 61 has been moved to the dotted line position B the power belts have been shifted onto the loose pulleys 12 and 13 and the shifter mechanism has been locked due to the lever 88 having the notch 89 which has moved into a position underlying the shifter 29. When this has occurred, it is also apparent that the brake 34 has been applied to the fixed pulley of the shaft 5. This is by reason of the fact that this brake is on the shaft 31 which shaft is rotated by the rod 69 and by the cam on which the brake is seated, rotation of this shaft forces the brake into engagement with the periphery of the fixed pulley, thereby retarding the rotation of the pulley shaft.

Figure 3:
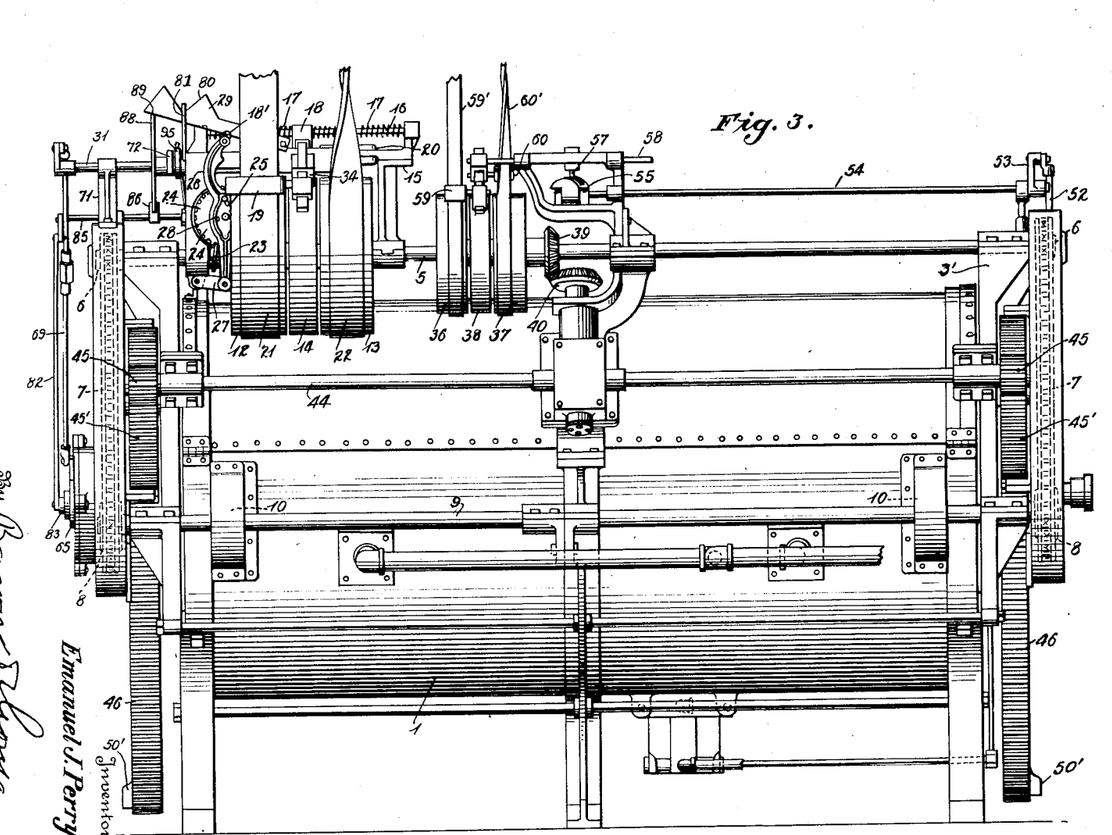
Figure 3 is a rear elevation.

This movement of the lever 61 toward the operator, as before stated, stops the motion of the parts, and also centers the washing cylinder where it will be locked in the desired dumping position. This is accomplished through the shifting of the dogs 63 and 65 into inter-locking engagement. When these dogs come into engagement the link 66 serves to impart motion to the dog 65, causing a stopping of the machine, and an application of the brake thereto. The belt shifter lever or rod 69 is so connected that when the motion of the machine is arrested, the washing cylinder will come to a halt with the lock receiving opening 90 thereof in the position shown in Figure 12. When the lever is released after this operation, it is of course moved forward to the dotted line position represented by character C, whereupon the locking bolt 64C is forced into the opening 90 formed in the disc 67. This locks the cylinder in its dumping position. It will be furthermore understood that as soon as the movement of the machine has been arrested, the locking lever 88 having the notch 89 therein has moved under the influence of its actuating spring 84 to a position underlying the shifter control cam 29, so that this shifter remains in a raised or inoperative position until manually lowered. Immediately after the machine has been locked, and the shifter engaged by this lever 88, a spring 90' urges the dog 65 forwardly, causing a forward movement to be imparted to the rod 69 for the purpose of moving its cam 72 to the position shown in Figure 3, and likewise to release the brake 34 on the shaft 30. This is necessary inasmuch as the shaft carrying the fixed pulley with which this brake cooperates must rotate a slight amount upon the lifting of the washing cylinder from the machine to a dumping position. We understand, however, that the locking lever 88 at this time remains under the shifter 29 so that no motion can be imparted to the machine.

Figure 12:
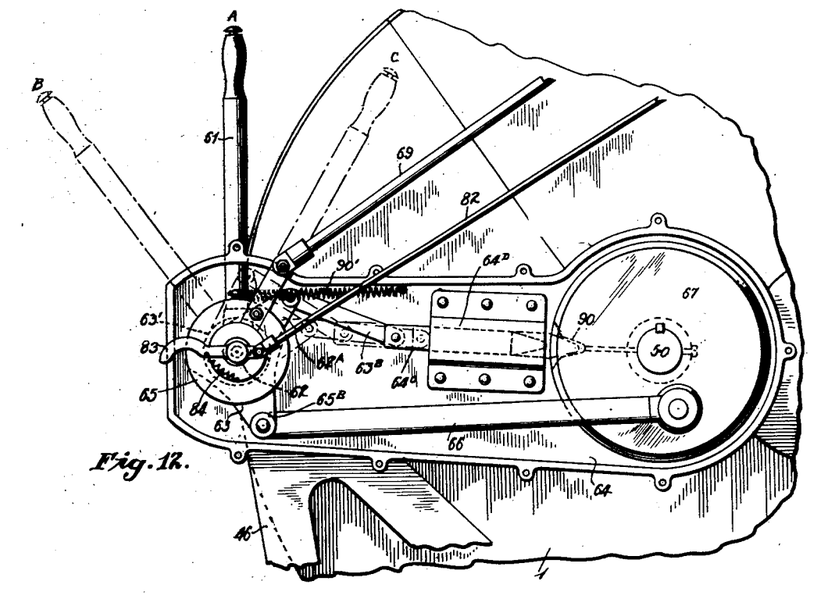
Figure 12 is an enlarged elevation of the rotation control mechanism.
Figure 13:
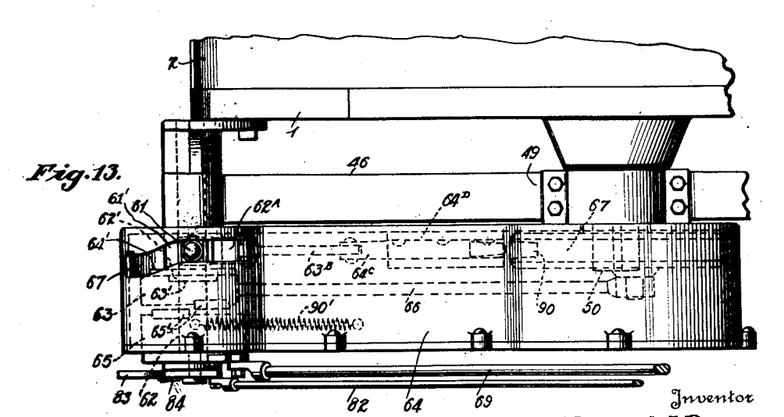
Figure 13 is a plan view thereof.
Figure 14:
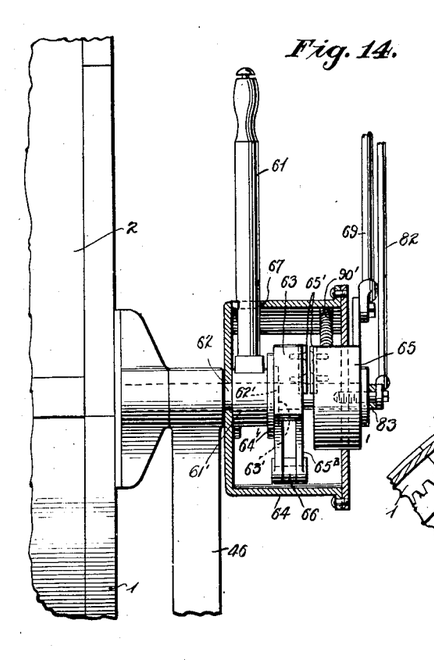
Figure 14 is a transverse section thereof.

It will be appreciated that when the lever 61 is in the position shown by the character C, Figure 12, it has, of course, shifted the brake operating shaft, which shaft has connected therewith a locking arm 92 in a housing 93. This locking arm is connected to the brake shaft by means of the link 94. The locking arm carries a roller at its outer end and serves to lock the sliding closure 2 so that this closure cannot be opened until after the machine has been stopped by the shifting of the belts to the neutral pulleys and the braking of the machine. When this has occurred, the locking arm is lifted so that the closure 2 can be swung to an open position. Obviously the power mechanism cannot be placed in driving connection with the machine until after the door 2 has been closed.

Figures 4, 5:
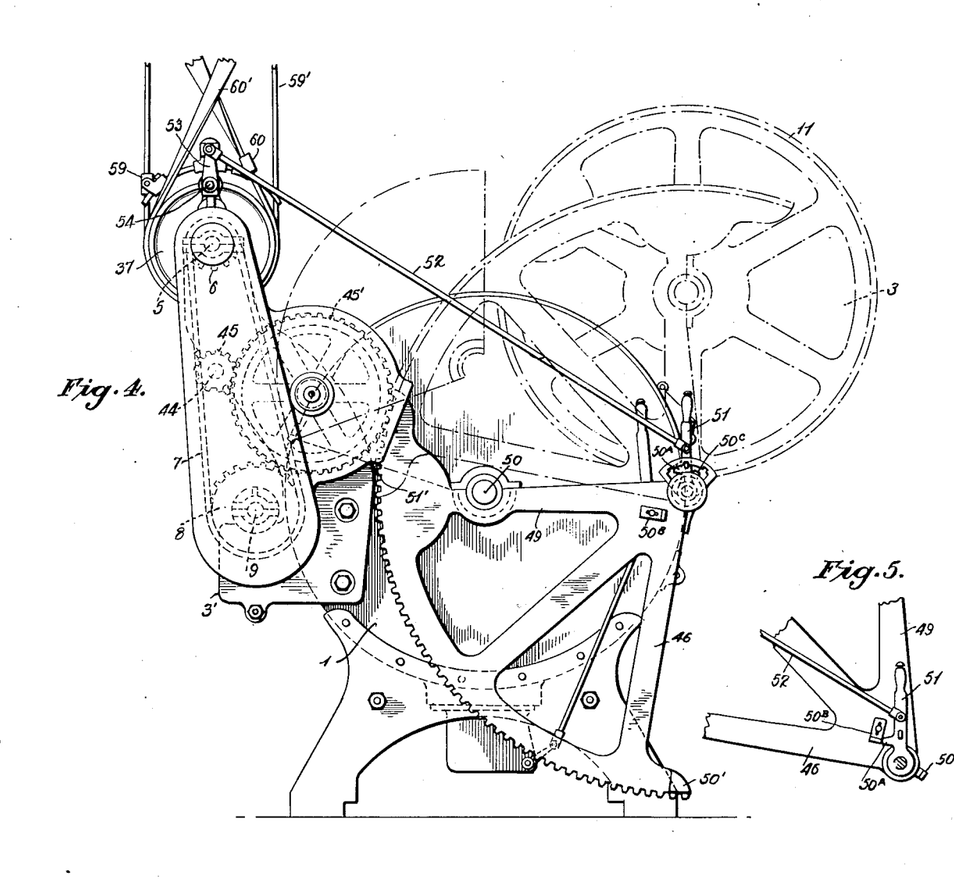
Figure 4 is a view in elevation of the opposite end of the machine.
Figure 5 represents a detail of the cylinder raising control mechanism.

To elevate the washing cylinder from the machine or to raise it to a dumping position, a hand lever 51 is employed. This lever is connected by a link 52 to an arm 53 rigidly keyed on the shaft 54. This shaft at its outer end carries a cam 55 having a camway therein receiving a pin 57 fixedly secured to the shifter shaft 58 carrying the belt shifters 59 and 60. Normally these belts lie on the loose pulleys 36 and 37. It is obvious that by moving the lever to a predetermined position, the straight belt 59' or crossed belt 60' may be moved on to the pulley 38 having a driving connection with the elevating mechanism of the machine. The cross belt causes a rotation of the shaft 44 in one direction, while the straight belt will rotate the shaft in an opposite direction. In this manner by proper manipulation of the hand lever 51, the cylinder may be lifted from the casing, maintained in its raised position, and at the desired time returned to its confined position by the mechanism that has been heretofore described. As shown in Figure 4, to elevate the washing cylinder, the lever 51 is moved forwardly. This lever carries a lug 50A. One of the arms of the lifting segment 46 at this side of the machine carries a lug 50B, which it is obvious rises as the segment rises, contacts with the lug on the lever 51 and gradually shifts this lever to its neutral position as the cylinder is being lifted from the casing. This causes a corresponding movement of the belt shifters 59 and 60 whereby as soon as the cylinder reaches its elevated position the belts operated by such shifters will be thrown on the loose pulleys 36 and 37, and the lifting movement of the cylinder terminated when it reaches a raised position or just prior to the time the offset stop lug on the segment 46 engages the stop positioned in its path. To lower the machine the lever 51 is moved in an opposite direction or toward the operator and gradually returned to its normal position by a second lug 50C carried by one of the radial arms of the segment which contacts with the lug 50A on the lever 51 and gradually brings this lever to its normal position. It will be understood that the mechanism including the gearing, etc., for lifting and lowering the washing cylinder 3 in its casing is substantially the same mechanism as disclosed in my copending application No. 50,075, and reference can be had to this application in order to obtain a full and definite understanding of the details of this mechanism, which, however, is believed to be quite clearly disclosed in this application.

Assuming that the cylinder is in a lowered position, and that it is desired to bring the machine to a standstill and to lift the cylinder from the casing to dump the contents thereof, the following operation takes place:

The lever 61 is grasped and moved to the dotted line position B, Figure 12. This movement by reason of the cam slot in the casing 64 shifts the lever laterally moving the dog 63 over so that its hardened face or lug engages the complemental lug on the dog 65.

Figure 1:
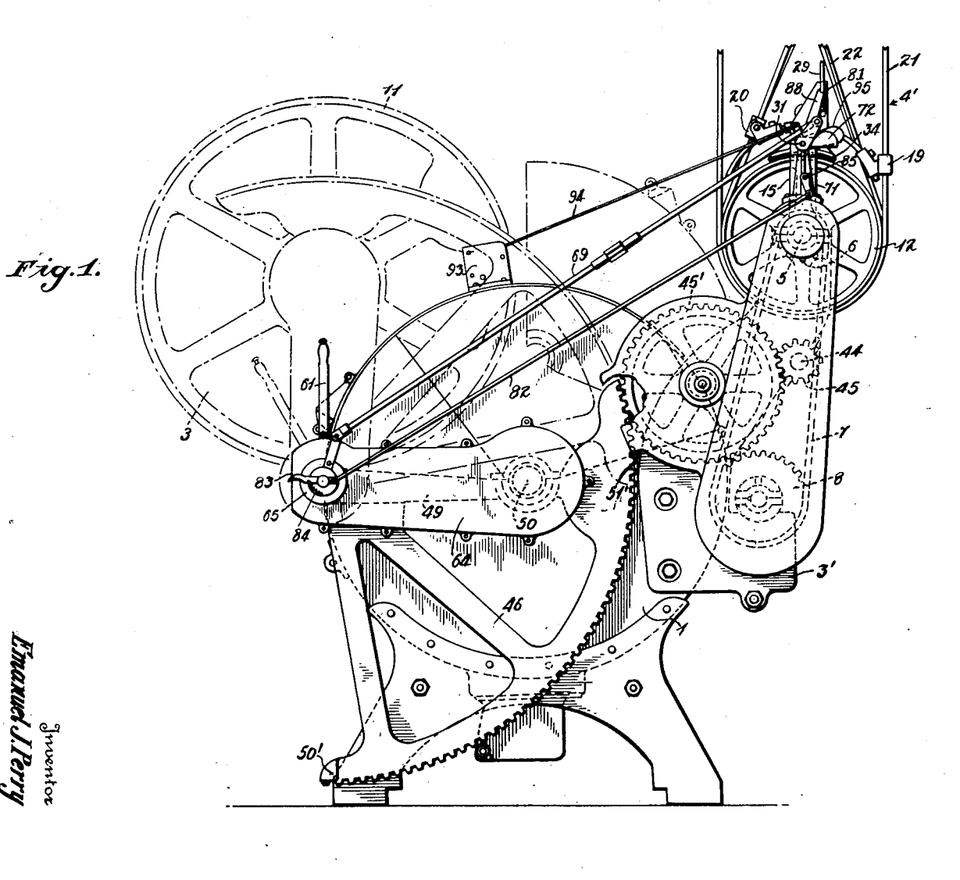
Figure 1 represents an end elevation of the machine.
Figure 15:
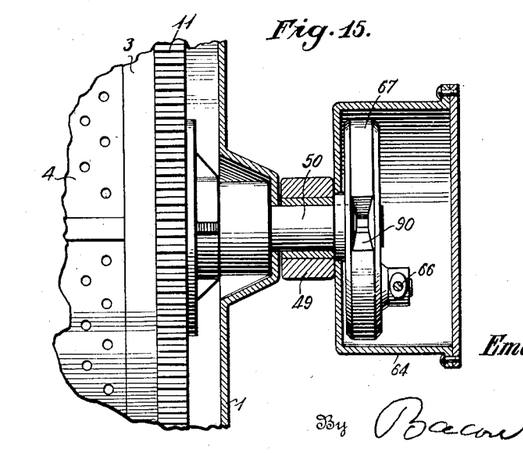
Figure 15 is a similar view.
Figure 16:
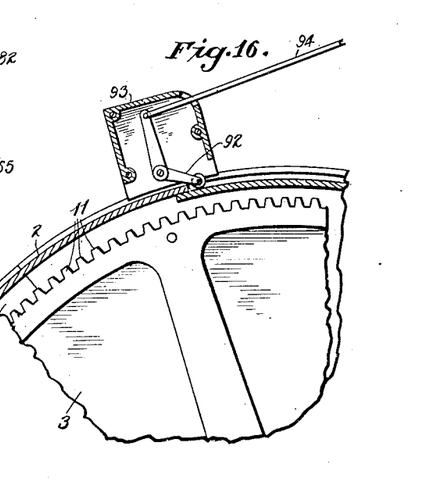
Figure 16 is a detail, sectional view of the automatic stopping mechanism.

By the link 66 which is connected to the disk 67 keyed to the washing machine cylinder shaft, Figure 15, motion is imparted to the dog 65. This motion moves the dog 65 in a counter-clockwise direction. In so doing, the dog immediately causes an actuation of the rod or shaft 69 connected with a crank arm on this dog. This rod 69 at its outer end is connected with the shaft 31 so that a motion thereof rotates this shaft serving to lift the member 72 upwardly into contact with the under side of the shifter lever 29 which due to the V-shaped slot 80 therein co-acting with the walls of the projection 81 moves the belt shifters to an inoperative position, or to a position where the belts are in contact with the loose pulleys 12 and 13. At the same time, this rotation of the shaft 31 causes the brake 34 to be forced into contact with the surface of the fixed pulley 14. This serves to brake the machine bringing it to an immediate stop. The rod 69 and the link 66 are so connected, and are of such length that when the motion of the washing cylinder ceases, the opening 90 in the disk 67 thereof will be in line with the locking detent 64C. Just as soon as the motion of the cylinder has ceased, or as soon as the rod 69 has been operated, a second rod or shaft 82 is operated by the spring 84. This shaft is connected to the lever 83 pivoted to a stationary part of the machine which lever is under the influence of the spring 84 and moved, whereby the locking lever 88 is raised to the position shown in Figure 4 at which time its notched end 89 lies under the shifter control cam 29. This retains the shifter lever in the position shown in Figures 3 and 4. The operating lever 61 is then moved forwardly to the dotted line position represented by the character C, Figure 12. This movement throws the locking bolt 64C forwardly so that the washing cylinder is positively locked in its centered position. At the time this lever is being moved forwardly, a spring 90', Figures 12 and 13, is also urging the dog 65 to the right for the purpose of shifting the rod 69 to the position shown in Figure 6, whereby its member 72 will be lowered to the position shown in Figure 4 and the brake 34 released from the fixed pulley 14. The shifter lever 29, however, at this time is still retained in the position shown in Figure 3 to prevent the operation of the machine by reason of the lever 88 which has been heretofore described, this shifter control cam 29 being retained in this position until it is manually released by an operation of the lever 83, Figure 12. It is necessary to release the brake 34 at this time because of a gearing connection with the segment 46, Figure 1, which requires a rotation of the shaft 5 during a portion of the lifting movement of this segment when the train of gears is in mesh. It will be understood that during this forward movement of the lever A to the position shown by reference character C, Figure 12, that the latch operating rod 91 has been engaged and shifted so as to release the closure for the washing machine to permit this closure to be raised. When the rotation of the cylinder has been stopped in this manner, the lever 51 is then operated. This lever is moved forwardly. In so doing, it rotates the shaft 54 operating the cam 55 which moves the belt shifters 59 and 60 so that the proper belt is brought into contact with the surface of the pulley 38. The rotation of this pulley through the gears 39 and 40 imparts a rotary motion to a shaft 41 having a worm 42 meshing with the worm gear 43 on the shaft 44. This shaft extends longitudinally of the washing machine and carries a pair of gears 45 at each end thereof, which gears mesh with teeth of an intermediate gear 45', which intermediate gears in turn mesh with the teeth of the segments 46. This raises the washing cylinder to the position shown in Figure 1. The cylinder automatically comes to a halt when in this position by reason of the co-acting lugs 50A and 50B on the lever 51 and one of said lifting segments 46. The closure of the washing cylinder is then opened and the contents thereof dumped into waiting receptacles by gravity. To lower the cylinder into the machine, the lever 51 is moved toward the operator. This causes a shifting of the belts 59' and 60' so that the mechanism is operated in a reverse direction. The cylinder is gradually lowered and the belts gradually shifted on to the loose pulleys 36 and 37, the mechanism coming to a halt at the proper time by reason of the lug 50C on the segment 46 co-operating with and shifting the lever 51. Just at the time the cylinder enters the casing, these lugs have moved the lever 51 a sufficient distance to cause the belts to be placed on the lose pulleys 36 and 37. The machine is then in condition for a second operation. This occurs by merely releasing or lifting the lever 88 from under the shifter link 29 through an operation of the lever 83, Figure 6, with of course, a return of the control lever 61 to the full line position represented by the character A, Figure 12.

From the foregoing description, it will be understood that the term "centering" is employed to designate the action of bringing the washing cylinder to a stop in a predetermined position, this position being herein designated as the "centered" position. This term is reasonably expressive of the meaning intended and was selected with a view to avoiding the repeated use of lengthy descriptive phrases. In view of this explanation, the meaning intended by the use of these terms in the specification and claims should be quite clear.

Having thus described the invention what I claim is:

1. In a washing machine, the combination with a casing, of a rotatable washing cylinder therein, mechanism for rotating said cylinder including a shiftable belt, and manually operable control means for said belt and for centering and locking the washing cylinder, including a controlling lever, means operatively connected therewith for shifting the belt to an inoperative position upon a predetermined movement of said lever and for centering the cylinder, and means actuated by a different movement of the lever for locking the cylinder in a centered position.

2. In a washing machine, the combination with a casing, of a rotatable washing cylinder therein, mechanism for rotating said cylinder including a shiftable belt for operating said mechanism, and manual controlled means for said belt and for centering and locking the washing cylinder, including a controlling lever, means connected therewith for causing a shifting of the belt to an inoperative position upon a predetermined movement of said lever and for centering the cylinder, and means operated by the lever for locking the cylinder in a centered position.

3. In a washing machine, the combination with a casing, of a rotating cylinder therein, pulley driven mechanism for rotating said cylinder alternately in opposite directions, driving belts for operating said mechanism, and manually operable control means for said belts for disconnecting the same from driving relation with said mechanism for thereafter stopping the cylinder in a predetermined position, and mechanism operable by said control means for locking the cylinder in such predetermined position.

4. In a washing machine, the combination with a casing, of a rotating cylinder therein, pulley driven mechanism for rotating said cylinder alternately in opposite directions, driving belts for operating said mechanism, and manually operable control means for said belts for disconnecting the same from driving relation with said mechanism and for stopping the cylinder in a predetermined centered position, mechanism operable by said control means for locking the cylinder in such predetermined position, and means operable by said control means for braking the power driven mechanism when the belts are disconnected from driving relation with said mechanism.

5. In a washing machine, the combination with a casing, of a washing cylinder therein, pulley driven mechanism for rotating said cylinder alternately in opposite directions, belts cooperating with the driving pulleys for said mechanism, a control lever for the cylinder, means operable upon a predetermined movement of the control lever for disconnecting the belts from driving relation with the pulleys and for centering the washing cylinder, by applying braking force to the pulley mechanism.

6. In a washing machine, the combination with a casing, of a rotatable washing cylinder therein, a pulley for rotating said cylinder, mechanism for controlling the cylinder and the pulley comprising manually operable control means to disconnect the power applied to the pulley, a brake operable by said means for the pulley, manually releasable mechanism for retaining the pulley in an inoperative position after the operation of said control means, and means for releasing the brake after its operation.

7. The combination with a casing, of a rotary cylinder therein, a pulley for driving said cylinder, a driving belt for said pulley, a control means for said belt comprising a control lever, a belt shifter operable thereby to move the belt to an inoperative position, braking means actuated upon the operation of said control lever, manually releasable means for retaining the belt in an inoperative position, means for releasing said brake after the operation of said manually controlled means, means for centering the washing cylinder, and means for locking the cylinder in a centered position.

8. In a machine of the class described, the combination with a casing, of a rotatable cylinder therein, a driving pulley, a belt for the pulley, mechanism for rotating the cylinder driven by said pulley, and control means including a control lever, means operable upon the actuation of the lever for controlling the operation of said pulley, manually releasable means for maintaining the pulley inoperative, means for centering said cylinder upon actuation of said lever, and means operable by the lever for locking the cylinder in centered position.

9. In a machine of the class described, the combination with a casing, of an oscillating cylinder mounted therein, belt driven means for operating said cylinder in alternate directions, control mechanism for said belt driven means for controlling the operation of the cylinder, a brake for said belt driven means operable when the latter is rendered inoperative by said control means, manually releasable means for maintaining such mechanism disconnected from its source of power after the operation of said control means, and means controlled by said controlled means for locking the cylinder in a centered position.

10. In a device of the character described, the combination with a casing, of a washing cylinder therein, a transmission shaft, gearing connecting said shaft and cylinder, means for imparting an alternating rotary movement to said shaft, and control means including a lever movable into two different operative positions which, when in one position, renders said first mentioned means inoperative and brings said cylinder to a stop in a predetermined rotative position, and means associated with said control means for positively locking said cylinder in such a predetermined position when the lever is in the second position.

11. In a washing machine, the combination with a casing, of a rotating washing cylinder therein, gearing for rotating said cylinder, manually controlled power actuated means for rendering said gearing inoperative, means associated with said first mentioned means for bringing said cylinder to a stop in a predetermined rotative position, and means automatically operable as an incident to the actuation of said first mentioned means for rendering said gearing inoperative, and separate manually operable means for releasing said automatically operable means.

12. In a washing machine, the combination with a casing, of a washing cylinder therein, a transmission shaft, gearing connections between said cylinder and shaft, an alternating rotary belt transmission operatively connected to said shaft, a brake acting upon said shaft, means for substantially simultaneously rendering said transmission inoperative and applying said brake, including connections with a power driven part of the machine for actuating the latter, and manually operable means for controlling said connections.

13. In a washing machine, the combination with a casing, of a washing cylinder therein, a transmission shaft, gearing connections between said cylinder and shaft, an alternating rotary belt transmission operatively connected to said shaft, a brake operatively connected to said shaft, means for substantially simultaneously rendering said transmission inoperative and applying said brake, including connections with a power driven part of the machine for actuating the latter, manually operable means for controlling said connections, and means operated by said manually operable means for locking said cylinder against rotative movement after it has been brought to rest by said brake.

14. In a washing machine, the combination with a casing, of a washing cylinder therein, a transmission shaft, gearing connections between said cylinder and shaft, a pulley fixed to said shaft, a pair of loose pulleys on said shaft, one on each side of said fixed pulley, a straight and a twisted belt operatively associated with said pulley for imparting an alternating rotary drive to said shaft, automatic means operable by said transmission shaft for alternately shifting said belts onto said fixed pulley, means for rendering said automatic means inoperative, and separate spring actuated means for locking said automatic means in inoperative condition when so rendered.

15. In a washing machine, the combination with a casing, of a washing cylinder therein, a transmission shaft, gearing connections between said cylinder and said shaft, a pulley fixed to said shaft, a pair of loose pulleys on said shaft, one on each side of said fixed pulley, a straight and a twisted belt operatively associated with said pulleys for imparting an alternating rotary drive to said shaft, automatic means for alternately shifting said belts onto said fixed pulley, a brake acting on said fixed pulley and manually set means operated by and in timed relation with the rotation of said cylinder for rendering said shifting means inoperative and for simultaneously applying said brake to stop said fixed pulley.

In testimony whereof I affix my signature.

EMANUEL J. PERRY.